United States Patent [19]

Schelat

[11] 4,044,997
[45] Aug. 30, 1977

[54] SEAT RING NOTCH FOR GATE VALVE GUIDE RAIL
[75] Inventor: Thomas A. Schelat, Pittsburgh, Pa.
[73] Assignee: Rockwell International Corporation, Pittsburgh, Pa.
[21] Appl. No.: 721,947
[22] Filed: Sept. 10, 1976
[51] Int. Cl.$^2$ .......................... F16K 3/12; F16K 27/00
[52] U.S. Cl. ..................................... 251/328; 251/329
[58] Field of Search ................................ 251/328, 329
[56] References Cited
U.S. PATENT DOCUMENTS

| 880,463 | 2/1908 | Paul | 251/328 |
|---|---|---|---|
| 1,765,717 | 6/1930 | Ericsson | 251/328 X |

Primary Examiner—Arnold Rosenthal

[57] ABSTRACT

A gate valve body having annular tapered seat rings retained in counterbores at inlet ends of an axial flow passage with the seating surfaces of the seat rings engageable by a tapered gate which is vertically guided by outwardly extending tongues on the gate slidably retained in grooves between laterally spaced pairs of guide rails on the body, the seat rings having a minor height less than width of the groove between the pairs of guide rails and an outer diameter greater than the lateral spacing between the guide rails, the seat rings being inserted into the associated counterbore by initially rotating the seat rings 90° from its final assembly orientation, radially shifting the seat ring to present the minor height section into one of the guide rail grooves, lowering the seat ring into registry with the flow passage, radially shifting the set ring into alignment with crescent shaped notches formed in the guide rails coaxial with the flow passage, rotating the seat ring to its assembly orientation and axially shifting the ring through the guide rail notches into operative position in the counterbore.

6 Claims, 3 Drawing Figures

SEAT RING NOTCH FOR GATE VALVE GUIDE RAIL

BACKGROUND OF THE INVENTION

The present invention relates to gate valves and, in particular, a seat ring mounting for a tapered gate valve.

The copending application Ser. No. 605,277 entitled DOUBLE DISC GATE VALVE WITH REPLACEABLE SPACER RING, now abandoned, filed in the name of Ronald J. Anders and assigned to the assignee of the present invention, discloses a double disc gate valve wherein the individual gate pieces have inclined or tapered annular surfaces which engage similarly inclined annular tapered surfaces formed on the inner end of a cylindrical seat ring retained in a counterbore at the inner end of the flow passage adjacent the valving chamber. The discs translate vertically within the valving chamber as guided by outwardly extending tongues on the lateral vertical sides of the discs retained in grooves defined by laterally spaced pairs of vertical guide rails. The seat rings, because of the tapered seating surface, have a minor height section at their top, a major height section at their diametrically opposed base, and median height sections as measured in a horizontal plane. The seat rings also have an outer diameter related to the diameter of the seating interface. For small, low pressure valves, the lateral spacing between the pairs of guide rails is greater than the outer diameter of the seat rings such that the same can be directly lowered into the valve cavity and axially shifted into alignment with and seating position within the counterbores. For the larger high pressure valves, the same dimensional relationships can be maintained, however, the same is done only with a corresponding increase in the size of the pressure seal components. In other words, to obtain a lateral spacing between the guide rails greater than the diameter of the seat ring, the body size and the wall thickness necessary to contain the fluid increases thereby resulting in an unnecessarily larger, more costly construction.

The present invention overcomes the above-noted deficiencies by providing a seat ring mounting wherein larger seat rings can be accommodated without increasing body size. Herein, the lateral spacing between the pairs of guide rails is less than the outer diameter of the seat ring to maintain optimum body size and wall thickness. Normally, this relationship would cause interference in lowering the seat ring into the cavity. In other words, the projected continuation of the seat ring in assembly would interfere with the guide rails. Moreover, the grooves herein between the pairs of guide rails are only slightly wider than the minor height section of the seat ring. To accomplish installation of the seat ring in the present invention, crescent shaped spaced notches are formed in the guide rails coaxially with the flow passage and the seat ring counterbores. The notches have a diameter slightly larger than the diameter of the seat rings. With this construction it is possible, as hereinafter noted, to lower the seat ring between the guide rails and axially shift the ring through the space between the notches into its operative position. More particularly, the seat ring is intially rotated 90° from its assembly orientation and the minor height section is laterally radially shifted into one of the grooves, the depth of penetration into the groove being sufficient such that the major height section lies inwardly of the inner edges of the opposed pair of guide rails. The seat ring is then vertically lowered until the axis of the seat ring lies in a common horizontal plane with the axis of the seat ring counterbore. In this position, the ring is laterally radially shifted into coaxial alignment with the notches and the counterbore, rotated 90° to its assembly orientation, and axially shifted to its operative position in the counterbore. The ring is thereafter welded into place. With the ability to thus assemble the seat ring in a manner accommodating minimal body sizes, weight and cost savings are realized.

The above and other features and advantages of the present invention will be apparent to those skilled in the art upon reading the following detailed description, reference being made to the accompanying drawings illustrating a preferred embodiment in which.

Figure 1:
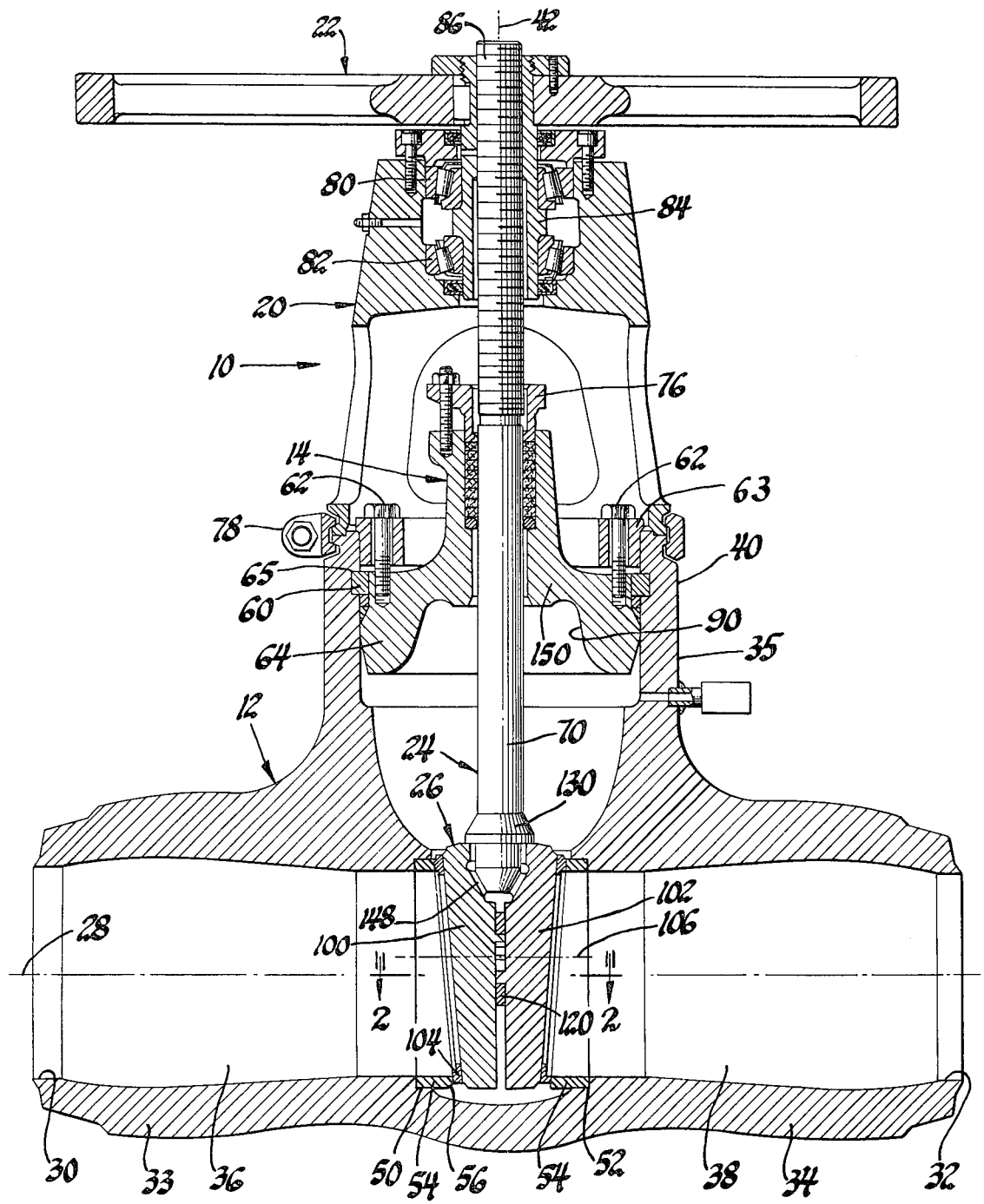
FIG. 1 is a cross sectional view of a gate valve incorporating the present invention.

Referring to FIG. 1, there is shown a gate valve 10 in accordance with the present invention of the general type shown and described in the aforementioned Anders application Ser. No. 605,277 and reference may be made thereto for additional details of construction.

The gate valve 10 comprises a valve body 12, a bonnet assembly 14, a yoke assembly 20 and a hand wheel assembly 22. Rotation of the hand wheel assembly 22 raises and lowers an internal stem assembly 24 and a double disc gate 26 to open and close a fluid passage extending through the valve body 12 along an axis 28 between a left hand outlet 30 and a right hand outlet 32.

The valve body 12 is a generally T-shaped cast carbon steel construction and includes outlet sections 33 and 34 and a control section 35 mutually intersecting a valving chamber occupied by the gate 26. The section 33 includes the aforementioned outlet 30 and a flow passage 36. The section 34 includes the aforementioned outlet 32 and a flow passage 38. The passages 36 and 38 are coaxially disposed along the flow axis 28.

Figure 2:
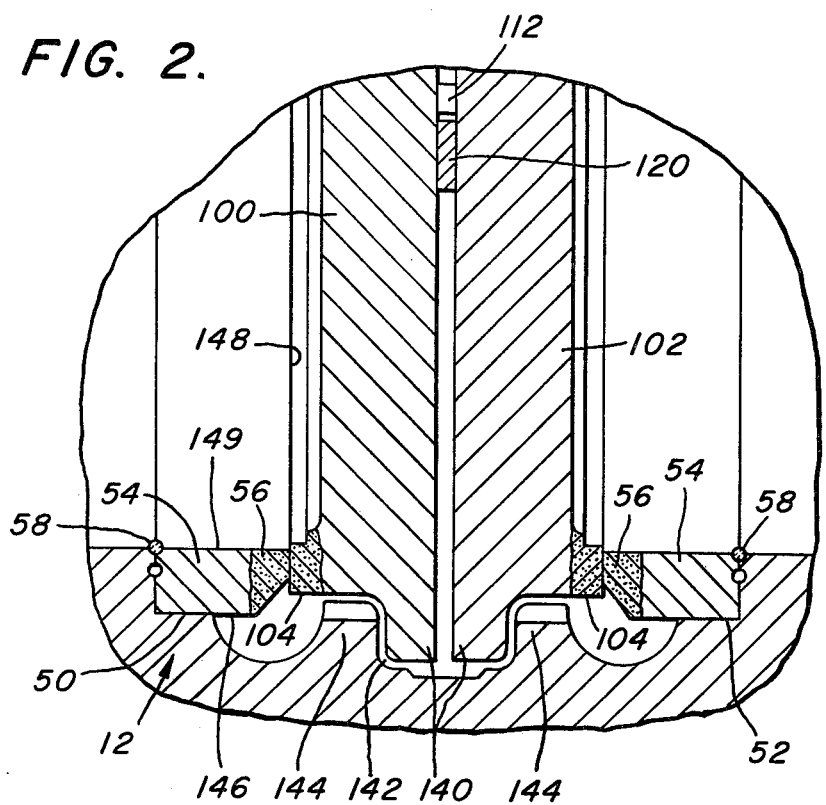
FIG. 2 is an enlarged fragmentary cross sectional view taken along line 2—2 of FIG. 1 showing details of contruction of the present invention.

The inner ends of the passages 36 and 38 are formed with counterbores 50 and 52 which receive tapered cylindrical seat rings 54. As described in greater detail below, the seat rings 54 are provided with annular seats 56 formed in planes inclined with respect to an operational axis 42 perpendicularly intersecting the flow axis 28. The planes of the seats 56 are symmetrically disposed with respect to the axes 42, 48. The seat rings 54 are fixed to the inner surface of the valve body at continuous circumferential welds 58 (FIG. 2).

The bonnet assembly 14 is retained at the upper end of the section 35 by means of the split retainer ring 60. Bolts 62 clamp the ring 60 to draw the outer flange 63 of the bonnet 64 upwardly against the retainer ring 60 which is retained in a peripheral circumferential channel section 65. The bonnet 64 is centrally apertured and receives the stem 70 of assembly 24. The hand wheel assembly 22 is attached to the upper end of the stem 70. The gate 26 is attached to the lower end of the stem 70 at enlarged T-slot connection 130, 148. A packing gland 76 seals the periphery of the stem 70.

The yoke assembly 20 is retained at the top of section 35 by means of a split yoke lock ring 78. A pair of roller bearings 80, 82 have their outer races received in counterbores at the upper end of the yoke 20 and their inner races fixedly carried at opposite ends of a rotatable bushing 84 which has an internal thread engaging the threaded end 86 of the stem. The bushing 84 is keyed to the hand wheel such that the rotation of the latter rotates the bushing 84 to raise and lower the stem 70 through the packing gland 76. This in turn raises and lowers the gate 26 between the illustrated lowered closed position and a raised open position wherein the gate 26 is housed within a generally hemispherical depression 90 in the lower surface of the bonnet 64.

The gate 26 comprises two identically formed gate discs 102 and 100, each of which has a hardened surface 104 engaging the hardened seats 56 of the seat rings 54. The surfaces 104 are similarly inclined with respect to the seats 56. The gate discs 100 and 102 are separated by spacer ring 120 and interlocking interiorly disposed hub.

Referring to FIG. 2, the individual discs 100 and 120 are provided with laterally projecting vertically extending tongues 140 which ride in the grooves 142 defined between pairs of inwardly projecting, vertically extending axially spaced guide rails 144, which pairs are laterally spaced on opposite sides of the axis 28. The inner guide surfaces of the guide rails 144 slidably engage the outer side surfaces of the tongues 140 to guide the gate 26 in its movement between positions. In the construction described herein, the seat rings 54 have outer cylindrical surface 146, an annular axial end face 147, an annular inclined seating face 148, and an inner cylindrical surface 149. The surface 146 has a larger diameter than the spacing laterally between the inner edges of the guide rails 144. Moreover, the height in the horizontal plane of seat ring 54 as well as height in the lower half of the seat ring is greater than the axial spacing between the facing surfaces of the guide rails 144.

With these relationships and without the provisions hereinafter noted, it would not be possible to lower the seat ring 54 into the valving chamber and axially shift the latter into seating relationship in the associated counterbore because of the interference with the guide rails 144.

However, in the present invention crescent-shaped circular notches 160 are formed in the sides of the guide rails 144. The notches 160 have an axis coaxial with the flow axis 28 and the axis of the counterbores. The diameter of the notches 160 is slightly larger than the cylindrical surface 146 of the seat ring 54. Accordingly, with the seat ring 54 coaxially disposed within the notches 160, it is possible to axially shift the seat ring 54 into the associated counterbore.

Figure 3:
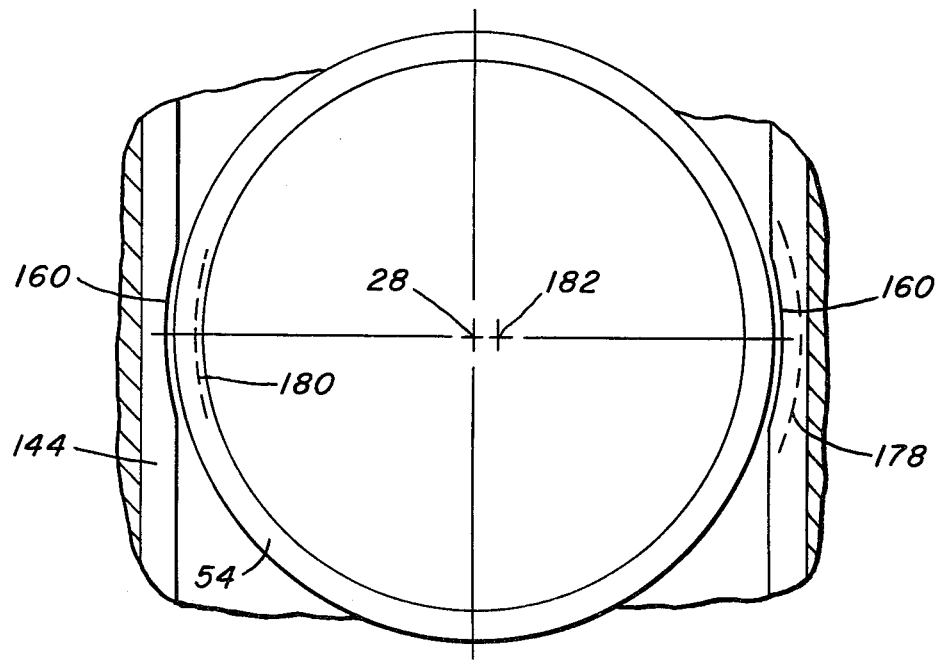
FIG. 3 is a fragmentary axial cross sectional view showing the seat ring aligned with the notches in the guide rails.

This accommodation can be made in two beneficial ways. First the grooves 142 can be made slightly wider than the height of the seat ring 54 as measured in the horizontal plane in which case the seat ring 54 may be directly lowered to a coaxial position with the notches 160 and axially shifted into seating relationship within the counterbores. A further savings in valve size and weight can be obtained by keeping the guide rails 144 as close together as possible, both laterally and axially, with the groove 142 being only slightly wider than the minor height of the seat ring 54 as measured in the cross section in the vertical plane. The groove 142 has a depth such that, when the ring is rotated 90° and inserted therewithin as shown by the dashed line 178 at the right hand side of FIG. 3, the major height of the seat ring diametrically opposite therefrom and having a height greater than the groove width, as shown by the dashed lines 180 in FIG. 3, is located inwardly of the inner edge of the rails 144. With this arrangement, the ring 54 may be vertically lowered into the valving chamber with the ring translating downwardly in the groove. As shown, the axis 182 of the seat ring 54 during this translation will be radially spaced to the right of the axis 28. When the seat ring 54 reaches the desired horizontal plane, the ring 54 is horizontally shifted into coaxial alignment with the axis 28. It may thereafter be directly axially inserted into the associated counterbore and then rotated 90° to its assembly orientation or initially rotated to its assembled orientation and then axially shifted into the bore and operative position. The notches 160 provide clearance with respect to the outer surface 146 of the seat ring 54 to accommodate this movement. Obviously, variations between the above are also possible.

It will thus be seen that the notched relief, in combination with the relative dimensions between the height of the seat and the width of the groove, permits the guide rails 144 to be spaced considerably more compactly than would otherwise be the case, thereby resulting in a pressure vessel of reduced size and weight with a consequential cost savings. While this invention has been disclosed with reference to a tapered gate, it will be apparent that other gate constructions including parallel seating surfaces will accommodate the insertion of seat rings having outside diameters larger than the lateral spacing between the guide rails.

While only one form of present invention has been shown and described above, other forms will be readily apparent to those skilled in the art. Therefore, it is not intended to limit the scope of this invention by the embodiment selected for purpose of this disclosure, but only by the claims which follows:

I claim:

1. A gate valve comprising: a valve body having a flow passage intersected by a cavity; an annular valve seat member of predetermined diameter and height receivable within a bore formed in the passage adjacent the cavity; gate means having annular surfaces engageable with the valve seat member in a closed position and spaced therefrom in an open position; tongue means along the sides of the gate means; rail means formed on opposite sides of the body along the cavity and having spaced guide surfaces defining grooves for receiving the tongue means to guide the gate means in moving between said positions, said grooves having a width greater than the predetermined height of said valve seat member, the spacing between rail means on said opposite sides being less than said predetermined diameter; and notch means in the rail means in the rail means defining an opening toward the bores larger than said predetermined diameter whereby said valve seat member can be positioned into the bore by lowering the valve seat member into the cavity between said guide surface, aligning the valve seat member with the notch means, and shifting the valve seat member through said notch means into said bore.

2. The gate valve recited in claim 1 wherein said notch means are defined by circular walls having a diameter larger than said predetermined diameter of the valve seat member.

3. The gate valve recited in claim 2 wherein said notch means are coaxial with the bore.

4. The gate valve recited in claim 1 wherein said gate means has inclined annular surfaces engageable with inclined annular surfaces on the valve seat member, the valve seat member having a median height in a plane transverse to the rail means, the grooves having a width less than the median height, the valve seat member being positioned in the bore by rotating the valve seat member to an orientation presenting a section less than the median height to the groove, inserting the section into the groove, lowering the valve seat member into position in alignment with the notch means, rotating and shifting the valve seat member through said notch means into assembly orientation in said bore.

5. The gate valve recited in claim 4 wherein the depth of the groove is such that with said section inserted into the groove, the opposed section of the valve seat member lies inwardly of the opposed rail means.

6. The gate valve recited in claim 5 wherein the section less than the median height is substantially the shortest section of the valve seat member and the groove is slightly wider than said shortest section.

* * * * *